United States Patent
Maciocci et al.

(10) Patent No.: US 9,547,374 B2
(45) Date of Patent: *Jan. 17, 2017

(54) USER INTERFACE INTERACTION FOR TRANSPARENT HEAD-MOUNTED DISPLAYS

(71) Applicant: QUALCOMM Incorporated, San Diego, CA (US)

(72) Inventors: Giuliano Maciocci, Duxford (GB); James Joseph Mulholland, London (GB)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,222

(22) Filed: May 26, 2016

(65) Prior Publication Data

US 2016/0274671 A1    Sep. 22, 2016

Related U.S. Application Data

(63) Continuation of application No. 13/800,329, filed on Mar. 13, 2013, now Pat. No. 9,389,420.

(Continued)

(51) Int. Cl.
    *G02B 27/01* (2006.01)
    *G06F 3/01* (2006.01)
    (Continued)

(52) U.S. Cl.
    CPC ............. *G06F 3/017* (2013.01); *G02B 27/017* (2013.01); *G06F 3/0482* (2013.01);
    (Continued)

(58) Field of Classification Search
    CPC .................. G02B 27/017; G02B 27/01; G02B 2027/0187; G06F 3/04842; G06F 3/017; G06F 3/0482; G06F 2203/04808
    (Continued)

(56) References Cited

U.S. PATENT DOCUMENTS 6,088,031 A * 7/2000 Lee ........................ G06F 3/0482
                                                 348/E5.105
6,819,345 B1   11/2004 Jones et al.
(Continued)

FOREIGN PATENT DOCUMENTS

CN          101825988 A       9/2010
EP          0679984 A1 *     11/1995
(Continued)

OTHER PUBLICATIONS

Bekel H. et al., "Interactive image data labeling using self-organizing maps in an augmented reality scenario", Neural Networks, Aug. 31, 2005, Elsevier Science Publishers, Barking, GB, vol. 18, No. 5-6, pp. 566-574, XP027815958, ISSN: 0893-6080.
(Continued)

*Primary Examiner* — Thomas Alunkal
(74) *Attorney, Agent, or Firm* — Kilpatrick Townsend & Stockton, LLP

(57) ABSTRACT

Embodiments of the present invention are directed toward enabling a user to quickly interact with a graphical user interface (GUI) displayed by the HMD. Utilizing techniques provided herein, a hand or other object can be used to select visual elements displayed by the HMD. The visual elements can be located within larger active regions, allowing the user to more easily select a visual element by selecting the active region in which the visual element is disposed.

20 Claims, 10 Drawing Sheets

Related U.S. Application Data

(60) Provisional application No. 61/659,914, filed on Jun. 14, 2012.

(51) Int. Cl.
 *G06F 3/0482* (2013.01)
 *G06F 3/0484* (2013.01)

(52) U.S. Cl.
 CPC .... *G06F 3/04842* (2013.01); *G02B 2027/014* (2013.01); *G02B 2027/0187* (2013.01); *G06F 2203/04808* (2013.01)

(58) Field of Classification Search
 USPC .................. 345/7, 8, 157, 158, 420, 633
 See application file for complete search history.

(56) References Cited

U.S. PATENT DOCUMENTS

| | | | |
|---|---|---|---|
| 6,847,336 B1* | 1/2005 | Lemelson | A61B 1/00048 345/8 |
| 8,217,856 B1 | 7/2012 | Petrou | |
| 8,253,685 B2* | 8/2012 | Katayama | G02B 27/017 345/156 |
| 2006/0044265 A1* | 3/2006 | Min | G02B 27/017 345/156 |
| 2008/0016463 A1 | 1/2008 | Marsden | |
| 2008/0204453 A1* | 8/2008 | Katano | G06T 17/00 345/420 |
| 2010/0229128 A1 | 9/2010 | Takahashi | |
| 2012/0113223 A1* | 5/2012 | Hilliges | G06F 3/00 348/46 |
| 2012/0218172 A1* | 8/2012 | Border | G02B 27/0093 345/8 |
| 2012/0218303 A1* | 8/2012 | Nakada | G02B 27/017 345/649 |
| 2012/0262558 A1 | 10/2012 | Boger et al. | |
| 2012/0262574 A1 | 10/2012 | Park et al. | |
| 2013/0021269 A1* | 1/2013 | Johnson | G06F 3/0488 345/173 |
| 2013/0194164 A1* | 8/2013 | Sugden | G02B 27/017 345/8 |
| 2013/0208014 A1* | 8/2013 | Fleck | G06K 9/00684 345/672 |
| 2013/0321462 A1* | 12/2013 | Salter | G06F 1/163 345/633 |
| 2013/0335303 A1* | 12/2013 | Maciocci | G02B 27/017 345/8 |

FOREIGN PATENT DOCUMENTS

| | | |
|---|---|---|
| JP | H0778055 A | 3/1995 |
| JP | H086708 A | 1/1996 |
| JP | 2010146481 A | 7/2010 |
| JP | 2010204870 A | 9/2010 |

OTHER PUBLICATIONS

International Search Report and Written Opinion—PCT/US2013/041647—ISA/EPO—Nov. 7, 2013.

White Sean et al., "Interaction and presentation techniques for shake menus in tangible augmented reality", 8th IEEE International Symposium on Mixed and Augmented Reality (ISMAR), Oct. 19, 2009, Piscataway, NJ, USA, IEEE, pp. 39-48, XP031568946, ISBN: 978-1-4244-5390-0.

\* cited by examiner

USER INTERFACE INTERACTION FOR TRANSPARENT HEAD-MOUNTED DISPLAYS

CROSS-REFERENCE TO RELATED APPLICATION

The present application is a continuation of co-pending, commonly assigned U.S. Non-Provisional application Ser. No. 13/800,329, filed Mar. 13, 2013, entitled "USER INTERFACE INTERACTION FOR TRANSPARENT HEAD-MOUNTED DISPLAYS," which claims the benefit and priority under 35 U.S.C. 119(e) of commonly assigned U.S. Provisional App. No. 61/659,914, filed Jun. 14, 2012, entitled "USER INTERFACE INTERACTION FOR TRANSPARENT HEAD-MOUNTED DISPLAYS." Both these patent applications are incorporated by reference herein, in their entirety, for all purposes.

BACKGROUND

A see-through head-mounted display (HMD) can provide transparent display area within a user's field of view in which a user can view both physical objects in the user's surroundings and virtual objects on the display. Some HMDs can provide "augmented reality" functionality by overlaying physical objects viewed by a user with digital content (such as text, pictures, and/or video) associated with the physical objects, or associated with the user's location and/or context, for example. Input to such HMDs are typically limited to buttons, a touch pad, or other simple input devices. These input devices can be bulky and inefficient.

SUMMARY

Embodiments of the present invention are directed toward enabling a user to quickly interact with a graphical user interface (GUI) displayed by a head-mounted display (HMD) using a hand and/or other objects. Utilizing techniques provided herein, a hand or other object can be used to select visual elements displayed by the HMD. The visual elements can be located within larger active regions, allowing the user to more easily select a visual element by selecting the active region in which the visual element is disposed.

An example method of providing a user interface in an HMD, according to the disclosure, includes causing a first visual element to be displayed in a transparent display area of the HMD. The first visual element is selectable by a user of the HMD. The method also includes defining a first active region of the transparent display area, larger than the first visual element, such that the first visual element is disposed within a portion of the first active region, and tracking a physical object that appears, from a perspective of the user, within the transparent display area. The method further includes determining at least a portion of the physical object appears, from the user's perspective, within the first active region, indicating a selection of the first visual element, and manipulating, with a processing unit, the user interface, based on the selection.

An example HMD, according to the disclosure, includes a display having a transparent display area, a sensor configured to provide data regarding objects viewable through the transparent display area by a user of the HMD, a processing unit communicatively coupled with the display and the sensor. The processing unit is configured to perform functions including causing the display to show a first visual element in the transparent display area, where the first visual element is selectable by the user, and defining a first active region of the transparent display area such that the first visual element is disposed within a portion of the first active region. The processing unit is further configured to use the data from the sensor to track a physical object that appears, from a user's perspective, within the transparent display area. Moreover, the processing unit is also configured to determine at least a portion of the physical object appears, from the user's perspective, within the first active region, indicating a selection of the first visual element, and manipulate one or more elements displayed on the display based on the selection.

An example computer-readable storage medium, according to the disclosure, is encoded with instructions for causing an HMD to perform functions including causing a first visual element to be displayed in a transparent display area of the HMD, where the first visual element being selectable by a user of the HMD, and defining a first active region of the transparent display area, larger than the first visual element, such that the first visual element is disposed within a portion of the first active region. The instructions also cause an HMD to track a physical object that appears, from a user's perspective, within the transparent display area, and determine at least a portion of the physical object appears, from the user's perspective, within the first active region, indicating a selection of the first visual element. The instructions further cause an HMD to manipulate one or more elements displayed in the transparent display area based on the selection.

An example apparatus, according to the disclosure, includes means for causing a first visual element to be displayed in a transparent display area of an HMD, where the first visual element is selectable by a user of the HMD. The apparatus also includes means for defining a first active region of the transparent display area such that the first visual element is disposed within a portion of the first active region, and means for tracking a physical object that appears, from a user's perspective, within the transparent display area. The apparatus further includes means for determining at least a portion of the physical object appears, from the user's perspective, within the first active region, indicating a selection of the first visual element, and means for manipulating, with a processing unit, one or more elements based on the selection.

Items and/or techniques described herein may provide one or more of the following capabilities, as well as other capabilities not mentioned. Techniques can provide for easily navigating a GUI by providing visual elements within large active regions. Furthermore, a selected visual element and corresponding active region may be replaced with additional visual elements and corresponding active regions (providing, for example, a submenu) for further interaction. These and other embodiments, along with many of its advantages and features, are described in more detail in conjunction with the text below and the attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the descrip

DETAILED DESCRIPTION

Figure 1:
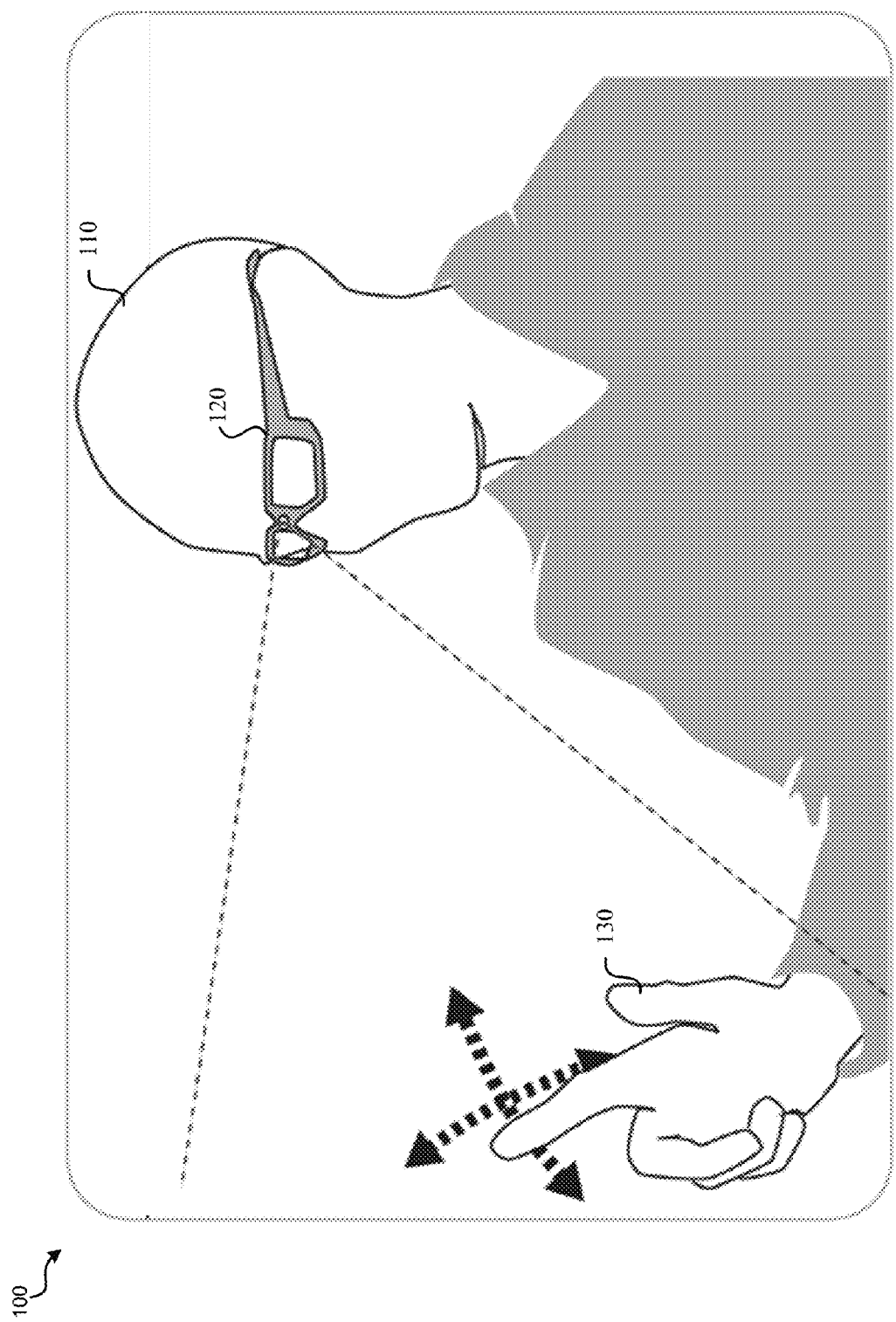
- FIG. 1 is a simplified illustration of an object tracking head-mounted display (HMD), according to one embodiment.

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

Embodiments of the present invention are directed toward enabling user interaction with a head-mounted display (HMD). HMDs are devices that can display information to a user wearing the device. Furthermore, because these devices are worn on a user's head, HMDs can have capabilities that are unachievable in other displays. For example, HMD's can provide a transparent display area within a user's field of view in which a user can view both physical objects and virtual objects on the display. Some embodiments can provide "augmented reality" functionality by overlaying physical objects viewed by a user with digital content (such as text, pictures, and/or video) associated with the physical objects, or associated with the user's location and/or context, for example. Embodiments of the present invention further enable a physical object seen and/or manipulated by a user to quickly select items in, and/or perform other interactions with, a user interface (e.g., a graphical user interface, or "GUI") displayed by the HMD.

Although examples provided herein discuss a single physical object (e.g., a hand, finger, etc.) used to interact with an HMD, the techniques provided herein can easily allow a user to interact with a user interface displayed by an HMD with two or more physical objects. Further, although embodiments are described herein with respect to a HMD, those of skill in the art will appreciate that other displays or other forms of heads-up displays may be utilized. For example, embodiments described herein may be implemented with respect to one or more contact lenses that a user may wear and/or may be implemented in another form of display through which a user may perceive a field of view.

FIG. 1 is a simplified illustration 100 of an HMD 120 configured to track an object for user interface interaction, according to one embodiment. In this embodiment, the HMD 120 worn by a user 110 has a camera and/or other sensor(s) (e.g., sensors capable of sensing light, heat, ultrasound, radio frequency (RF) signals, etc.) providing data with which an object, such as the user's hand 130, may be tracked. In so doing, the HMD 120 is able to manipulate a GUI displayed by the HMD 120, obviating the need for a separate interface (e.g., touch pad, buttons, etc.) to receive user input. Even so, other interfaces can be incorporated into and or communicatively coupled with the HMD 120, depending on desired functionality. Further, display of one or more elements and/or presentation of a GUI may be omitted in some embodiments. For example, embodiments are described below in which no visual element is displayed when accepting an input from a user. Further, functionality caused or selected by the user input may or may not be visual in nature. To perform the functions described herein, the HMD 120 may incorporate and/or communicate with a computer system, such as the one described below in relation to FIG. 10.

Figure 2:
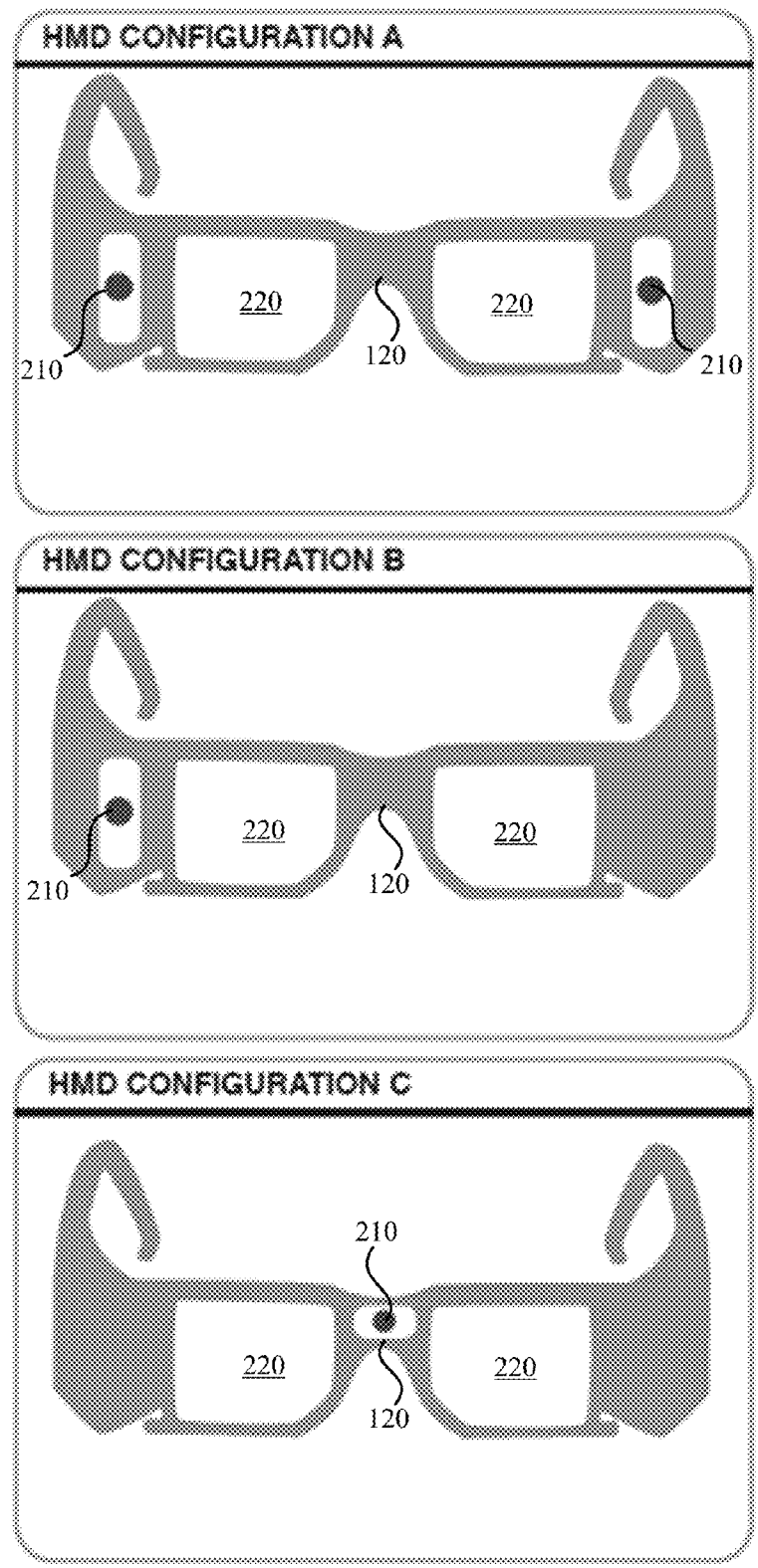
FIG. 2 is an illustration of various embodiments of an HMD that can utilize the techniques provided herein.

FIG. 2 is an illustration of various embodiments of an HMD 120 that can utilize the techniques provided herein. The embodiments shown include displays 220 and one or more cameras 210. These embodiments include a frame similar to eyeglasses that can rest on the nose and ears of a user, positioning the displays 220 in front of a user's eyes.

At least a portion of the displays 220 is transparent, providing a transparent display area that enables a user to view not only visual elements shown on the displays 220, but also physical objects in the user's surroundings. The level of transparency of the visual elements shown on the displays 220 may vary, depending on the desired functionality of the displays 220, settings of a GUI shown on the displays 220, and/or a software application executed by the HMD 120 (e.g., a video, a map, an Internet browser, etc.). Although embodiments shown in FIG. 2 illustrate displays 220 positioned in a eyeglasses-like frame, other technologies capable of providing a transparent display area (e.g., a retinal projector, contact lens(es), or other optical system) can be utilized in other embodiments.

The outward-facing camera(s) 210 can capture images of the user's surroundings, including the user's hand 130 and/or other objects that can be controlled by the user 110 to provide input to the HMD 120. As indicated in FIG. 2, the cameras can be RGB (red, green, blue) and/or RGBD (red, green, blue, plus depth) cameras, but other embodiments may include other types of cameras and/or sensors that provide images and/or other information to a processing unit that enables the HMD 120 to track a physical object in front of the user. In one embodiment, for example, an HMD 120 can utilize a single RGB camera 210 to track a physical object's vertical and horizontal position. Other embodiments can employ multiple cameras 210, and/or a camera 210 capable of determining depth (e.g., time-of-flight ranging camera) to track a physical object's depth as well. The camera(s) 210 can have a field of view that enables the HMD 120 to track a physical object that appears within the transparent display area from the perspective of the user. Embodiments may switch to a low-power mode when the physical object is not within the transparent display area from the perspective of the user 110. In some embodiments, the camera(s) 210 can have a field of view that is broader than the transparent display area, to allow the HMD 120 to begin executing and/or scale up object-tracking algorithms when the HMD 120 determines the physical object is approaching the transparent display area (from the perspective of the user 110).

Figure 3:
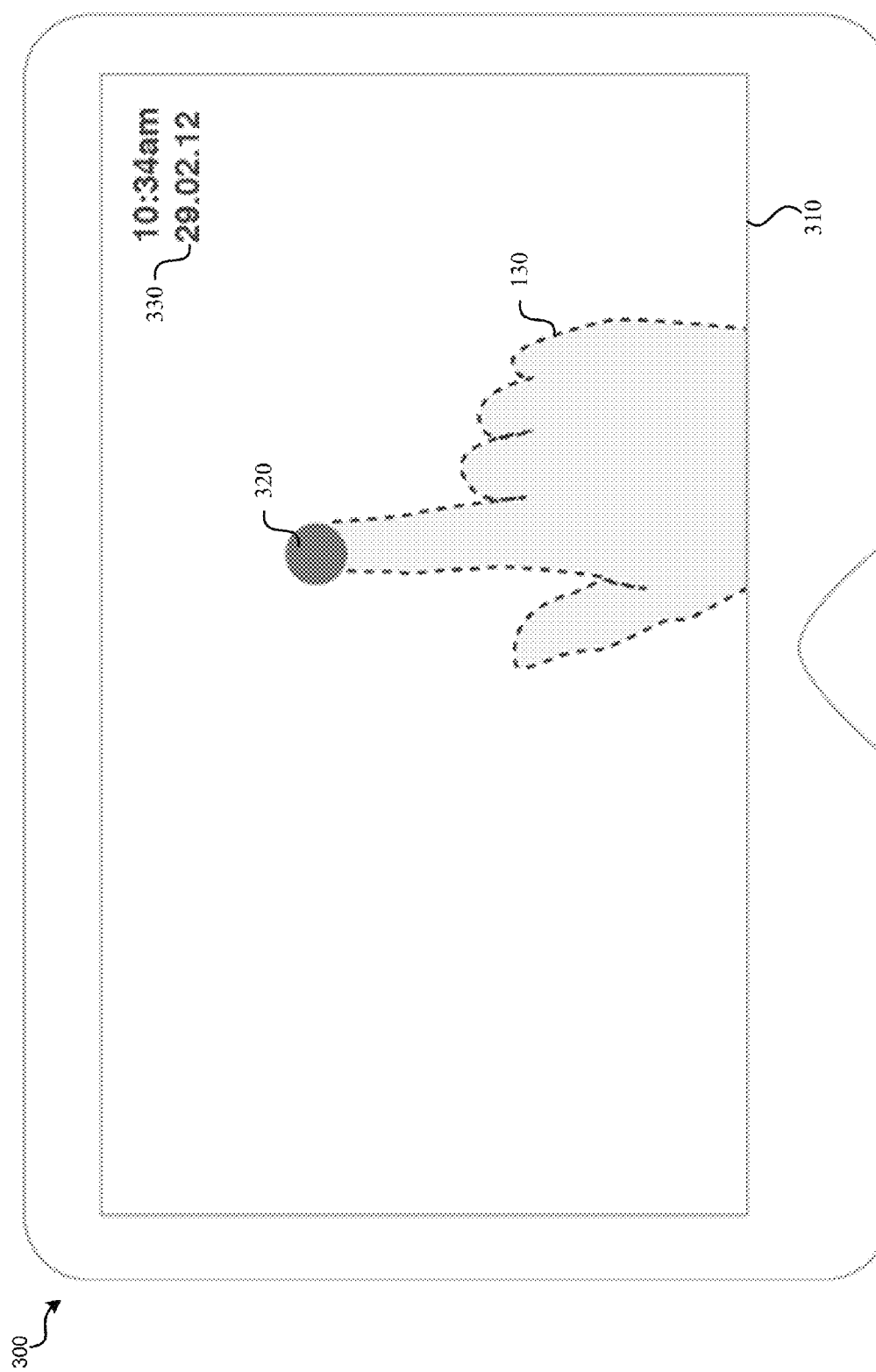
FIG. 3 illustrates a view through an HMD from the perspective of the user, according to one embodiment.

FIG. 3 illustrates the resulting view 300 through the displays 220 from the perspective of the user 110. As indicated above, the transparent display area 310 can enable the user 110 to see both visual elements shown in the transparent display area 310, as well as physical objects in the user's surroundings. In the example view 300 of FIG. 3, for example, the user is able to view displayed visual elements 330 indicating the date and time, as well as the user's hand 130.

The HMD 120 can execute tracking algorithms that receive images from the camera(s) 210 and track certain recognized objects. Furthermore, the camera(s) 210 and tracking algorithms can be calibrated to determine the location of a tracking point 320 on a physical object as it appears in the transparent display area 310 from the perspective of the user 110. In the view 300 shown in FIG. 3, this tracking point 320 corresponds to the fingertip of the user's hand 130. The manipulation of the physical object (e.g., user's hand 130), and corresponding movement of the tracking point 320, can enable the user 110 to interact with a GUI and/or other visual elements shown in the transparent display area 310. It can be noted that the tracking point 320 may or may not be highlighted in the transparent display area 310, depending on desired functionality.

Any of a variety of objects can be used to allow the user to interact with the GUI, such as the user's hand(s), a specialized apparatus, and/or any other object recognizable by the HMD. User settings of the HMD may allow a user to designate the object(s) to use for GUI interaction. As explained in more detail below, object tracking can utilize any of a variety of visual tracking methods, which may involve determining various traits of the object, such as the shape, color, and/or movement. In some embodiments, depth filtering can be utilized to help ensure an object tracked for GUI interaction is controlled by the user. Thus, the HMD will allow GUI interaction after the HMD determines the object is within a threshold distance from the HMD. Means for making this determination can include a processing unit coupled with sensors capable of determining distances, such as camera(s) (e.g., stereoscopic cameras, a depth camera, etc.), proximity sensors, and the like.

Figure 4A:
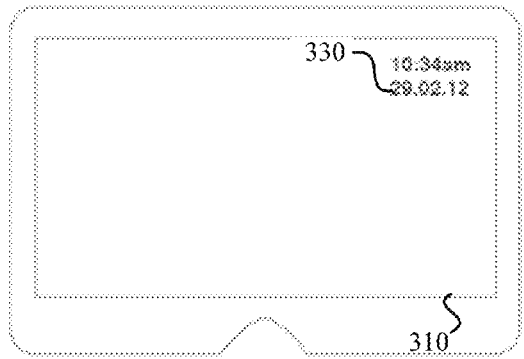
FIGS. 4A-4E are a series of illustrations that show how tracking of the physical object can enable a user to quickly navigate through a user interface of the HMD, according to one embodiment.

FIGS. 4A-4E are a series of illustrations that show how tracking of the physical object can enable a user to quickly navigate through a GUI of the HMD 120. FIG. 4A illustrates a transparent display area 310 with default visual elements 330, such as date and time, that the HMD 120 may display when the GUI and/or another application is not active. Although not shown in FIGS. 4A-4E, objects in the user's surroundings may be viewed through the transparent display area 310.

Figure 4B:
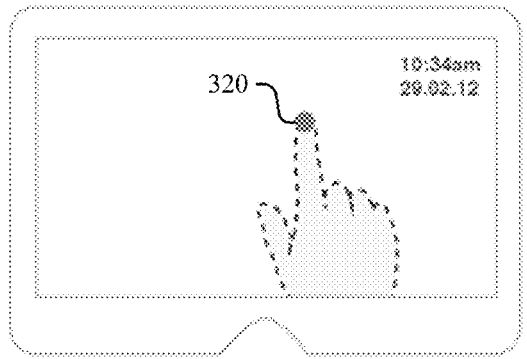

In FIG. 4B, the HMD 120 recognizes a physical object for GUI interaction and establishes a tracking point 320. As discussed previously, the tracking point 320 may or may not be highlighted (or otherwise indicated) in the transparent display area 310. The physical object can be any physical object (e.g., a body part, a pointing device, etc.) that can be recognized and tracked by the HMD 120. Some embodiments may allow a user 110 to designate which physical object can be used to interact with the HMD's GUI.

In some embodiments, the HMD 120 may not establish a tracking point 320 and/or evoke the GUI of the HMD 120 for user interaction (e.g., display a first set of visual elements and/or options) until a triggering event has occurred. This can help prevent unintended user interaction with the GUI. In some embodiments, the triggering event could be that the object engages in a certain pose, such as a hand with a pointer finger extended (as shown in FIG. 4B). In other embodiments, the triggering event could be that a recognized physical object appears in the transparent display area 310, for at least a threshold amount of time. Some embodiments could require both. For example, an HMD 120 could activate a GUI for user interaction after determining that the user's hand is has a pointer finger extended in an engagement pose and has been located within a field of view of transparent display area 310, from the user's perspective, for at least 2 seconds. Other embodiments may activate a GUI after periods of time greater or less than 2 seconds, depending on desired functionality. In some embodiments, the triggering event includes the user's hand and/or finger being located in a particular or predetermined portion of the display area 310, for example near an edge or in particular corner of the display area 310. Various other triggering events can be utilized.

Figure 4C:
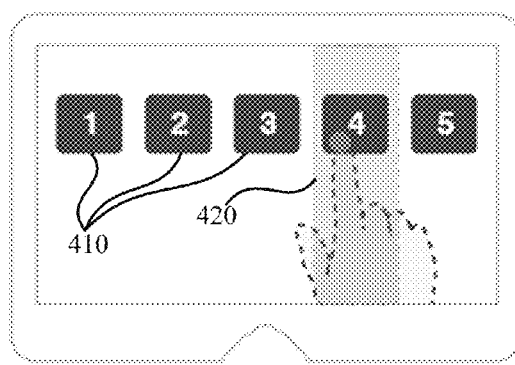
Figure 4D:
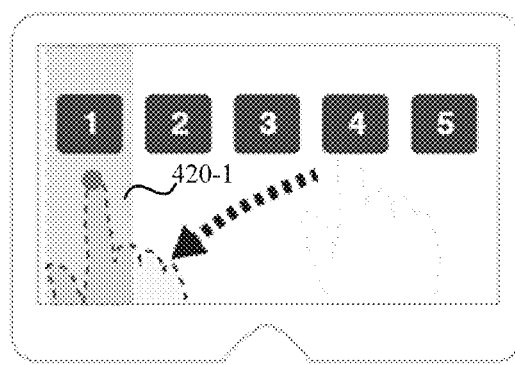

In FIG. 4C, the GUI of the HMD 120 displays a set of visual elements 410 corresponding to options from which the user 110 can select. Each visual element can be associated with and/or surrounded by a respective active region 420. In some embodiments, the elements 410 and/or the region 420 may be displayed in a virtual plane with respect to the user. The active regions 420 allow a user to select an option corresponding to a visual element by moving the tracking point 320 to the respective active region 420. Depending on the placement of the visual elements 410 and the desired size and shape of the active regions 420, one or more borders of an active region may extend to an edge of the transparent display area 310. Further, it may be easier for the user to move his hand back and forth in order to designate an element to select rather than having to place his hand or finger in a particular location closer to the bottom or top of the display area 310. Further, such selection areas may often be used even when the user is walking or the user's hand is not steady because the precision required to select a region 420 may be less than the precision required to select an element 410 in some embodiments. In some embodiments, identifying the user's hand as being in any portion of the region 420 as opposed to touching a particular element 410 may use less processing power and/or latency and/or images with lower resolution. In some embodiments, the visual elements 410 are not displayed at an approximately consistent vertical height as illustrated in FIGS. 4C and 4D. For example, one or more of the elements 410 may vary in vertical placement while still being located within a respective region 420 that is substantially columnar.

Although active regions 420 may take on various shapes and sizes, columns can be particularly helpful in facilitating easy GUI interaction. This is because, when the transparent display area 310 is partitioned into columns, visual elements 410 can be located at a vertically central location of the transparent display area 310 that allows the user to easily see the visual elements 410. Additionally, because the user's hand will likely enter the transparent display area 310 from the bottom edge, column-shaped active regions 420 can facilitate selection because they can extend downward toward the bottom edge of the transparent display area 310. In some configurations, the column-shaped active regions 420 can extend all the way to the bottom edge.

The way active areas are shown can vary, depending on the embodiment, which may be determined by one or more user settings. For example, some embodiments may allow all of the active regions 420 to be shown at once. That is, the active region 420 for each visual element 410 is shown (e.g., highlighted, having a visible border, etc.). In other embodiments, a particular active region 420 may not be shown until the tracking point 320 enters that region (e.g., as shown in FIGS. 4C and 4D). In some embodiments, the regions 420 may not be shown at all, but are used to determine a user selection.

FIG. 4D shows how such a selection is made. As illustrated, the user can move the object such that the tracking point 320 is located, from the user's perspective, within the active region 420-1 in which the visual element labeled "1" is located. The user can indicate a selection of the corresponding visual element in various ways, such as simply keeping the tracking point 320 within the active region 420-1 for a threshold amount of time, engaging the physical object in a "selection" pose (e.g., a closed fist, drawing back the pointer finger, etc.), and the like. In such embodiments, the HMD may display an icon indicating a length of time the tracking point 320 is located within an active region, such as a progress bar, counter, hourglass, or the like. Furthermore, in embodiments where the HMD 120 is able to track an object's depth, a selection can be made by moving the physical object in a direction toward or away from the user (e.g., making a "pushing" and/or "pulling" motion). Depending on desired functionality, the method of selection may be determined by the user by way of, for example, a user preferences menu.

Figure 4E:
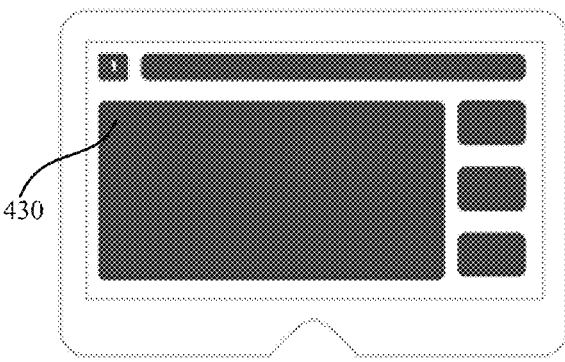

FIG. 4E shows how the GUI can display a second set of visual elements 430 once the selection is made. Any of a variety of visual elements can be displayed, depending on the functionality of the HMD 120 and the option selected. For example, the HMD 120 may include a GUI that enables a user to navigate through a variety of folders, menu screens, and/or other selection screens to select any of a wide variety of features and/or applications. Such applications can include, for example, an audio player, a video player, a navigation program, a camera/camcorder program, an augmented reality application, an Internet browser, and the like. Moreover, the HMD 120 may include other input devices, such as a microphone, touchpad, keyboard, etc., which can allow the user to further interact with a GUI and/or applications executed by the HMD 120 and shown in the transparent display area 310.

Figure 5A:
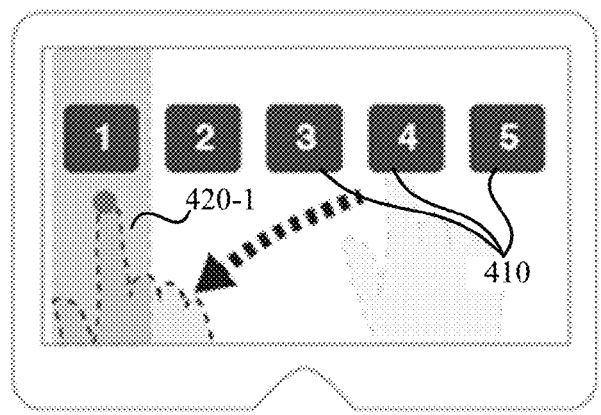
FIGS. 5A-5C illustrate another embodiment of how a Graphical User Interface (GUI) may respond to user interaction.
Figure 5B:
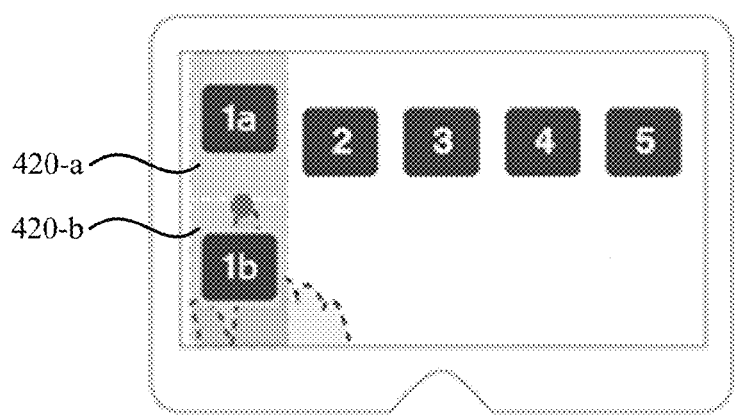
Figure 5C:
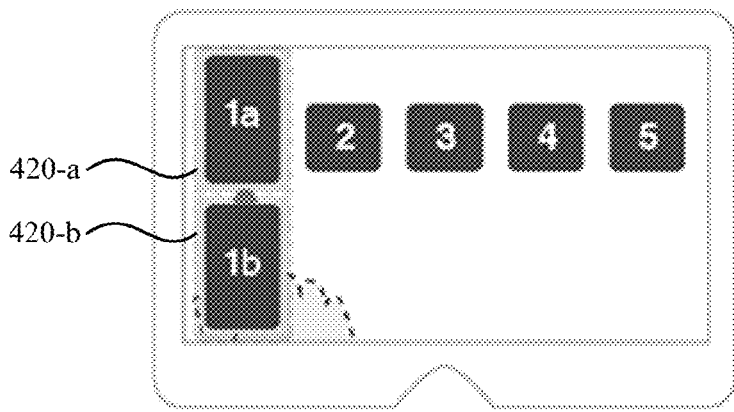

FIGS. 5A-5C illustrate alternative embodiments of how a GUI may respond to user interaction. In FIG. 5A, as with FIGS. 4C-4D, a user may be provided with a number of selectable visual elements 410. Here, however, after the user selects the first visual element "1" (e.g., by positioning his or her hand into the first active region 420-1 for a certain period of time), visual element "1" is replaced with additional visual elements "1*a*" and "1*b*," as shown in FIG. 5B. These additional visual elements can represent sub-menu items that provide another layer of depth to the menu of the GUI. The additional visual elements "1*a*" and "1*b*" have corresponding active regions 420-*a* and 420-*b*, respectively, by which a user can select the visual elements "1*a*" and "1*b*." Although only two visual elements are shown in FIGS. 5B and 5C to replace visual element "1" of FIG. 5A, any number of visual elements 410 (with a corresponding number of active regions 420) may be used. This number may depend on the visual element 410 selected, desired functionality, and/or other factors. Some visual elements 410 may not evoke additional visual elements at all, but instead evoke applications and/or other functionality.

FIG. 5C shows an optional variation of FIG. 5B, illustrating larger visual elements "1*a*" and "1*b*." In fact, different embodiments may have larger or smaller visual elements 410 than those shown the embodiments of the figures. Moreover, while some visual elements 410 may occupy only a small portion of their respective active regions 420, other visual elements 410 may occupy all or nearly all of their respective active regions 420. Furthermore, although FIGS. 5B and 5C show visual elements "1*a*" and "1*b*" within active regions 420-*a* and 420-*b* of the same width as the active region 420-1 of visual element "1," embodiments are not so limited. For example, to allow lower precision in menu selection, visual elements "1*a*" and "1*b*" and/or corresponding active regions 420-*a* and 420-*b* may extend horizontally, partly or completely across the display.

As an example of a GUI in which a visual element 410 may be replaced with multiple visual elements, a top-level menu can include a number of visual elements 410, as shown in FIG. 5A, representing different functions of the HMD, such as multimedia, Internet search, navigation, web browser, and the like, where each visual element 410 is positioned within a column-shaped active region 420. If the user selects the web browser visual element, a web browser application may be evoked. However, if the user selects the multimedia visual element, the column-shaped active region in which the multimedia visual element was located may be split into multiple active regions, each with its own visual element representing a type of multimedia, such as videos and music. Moreover, each of these additional visual elements (and respective active regions) may be split up even further into types of videos or music (for example, genres, playlists, movies, TV shows, etc.) in a similar fashion, such that there are multiple levels of submenus. Because each submenu may require an additional level of accuracy, the amount of submenu levels may depend on the options chosen and/or the desired functionality. For example, because movies are expected to require more attention from the user than music, movies may have more levels of submenus (which may require more accuracy to select) than music. Furthermore, levels of submenus may switch between vertical and horizontal alignments. For example, if the user selects visual element "1*b*" and there are submenu items associated with 1*b*, then those submenu items may again be distributed horizontally (similar to FIG. 5A), and so on.

Of course, the functionality illustrated in FIGS. 5A-5C are provided as an example of how a user may quickly navigate through menu and submenu options without removing the unselected visual elements 410 from the display. Alternatively, selection of a visual element 410 may evoke a new set of visual elements 410 representative of a submenu which replaces the original menu altogether.

Figure 6A:
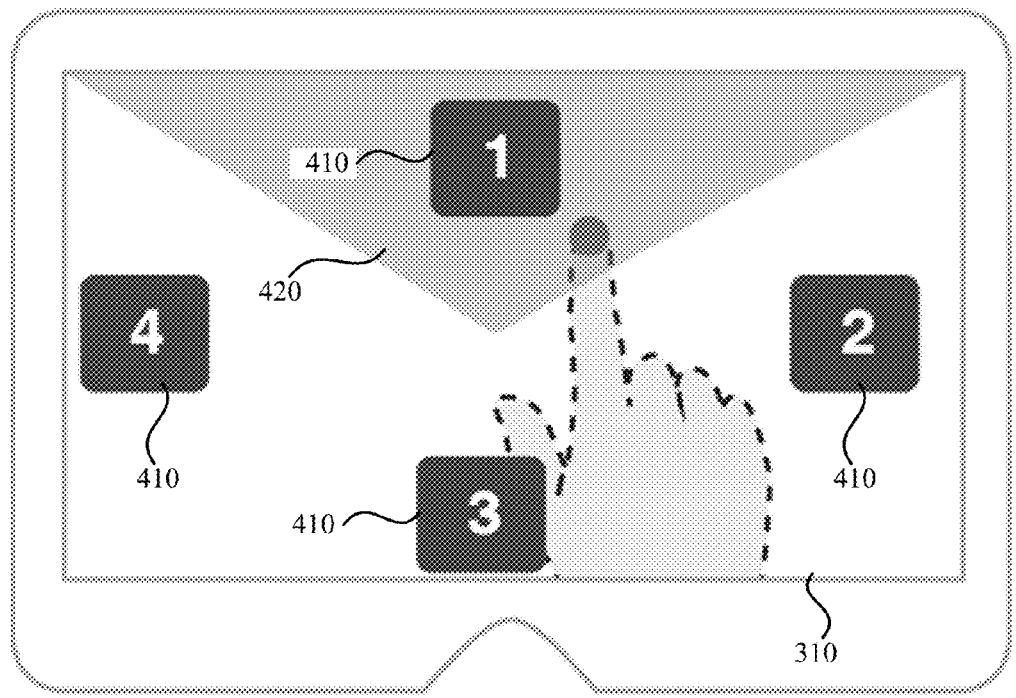
FIGS. 6A-6B are illustrations demonstrating a layout of active regions according to one embodiment.
Figure 6B:
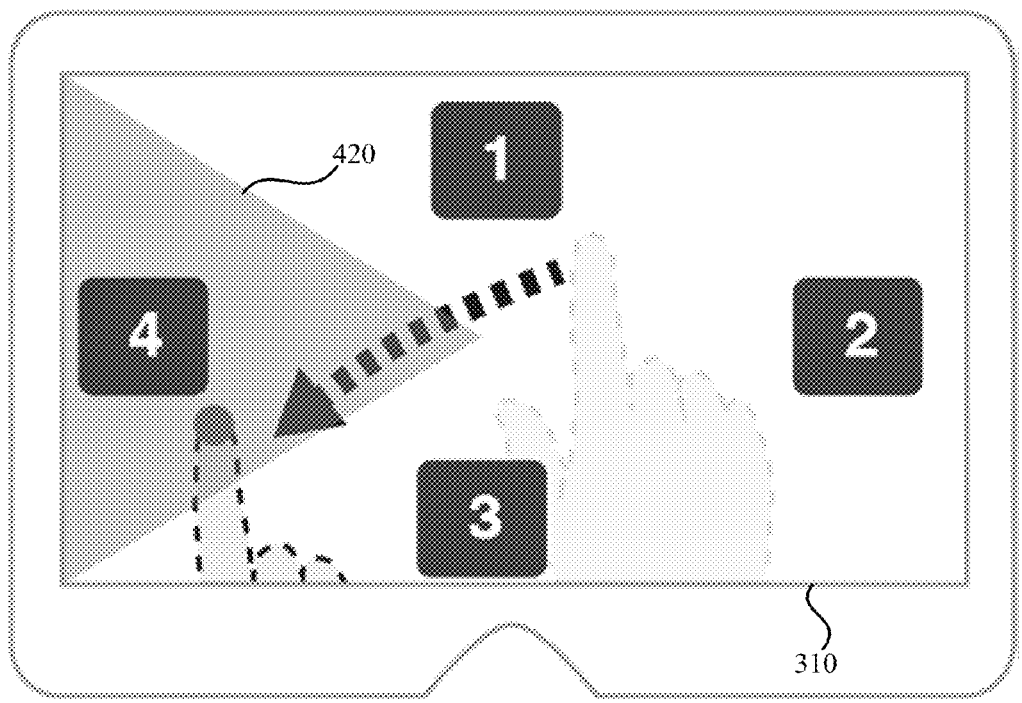

Although active regions 420 have been illustrated herein as columns of the transparent display area 310, embodiments are not so limited. FIGS. 6A-7B illustrate how active regions 420 can vary depending on the layout of the visual elements 410. FIGS. 6A and 6B, for example, illustrate how active regions 420 can be located in upper, lower, left, and right quadrants of the transparent display area 310. Selection of a visual element may be similar to embodiments described previously. Other embodiments may have more visual elements 410 or fewer visual elements 410, which may be positioned differently (e.g., in a grid, circle, or other fashion). In such embodiments, active regions are positioned to encompass the visual elements 410 correspondingly. Furthermore, embodiments may include spaces between active regions 420 that may not correspond with any visual element 410 or cause a selection to be made, which may make visual element selection easier.

Figure 7A:
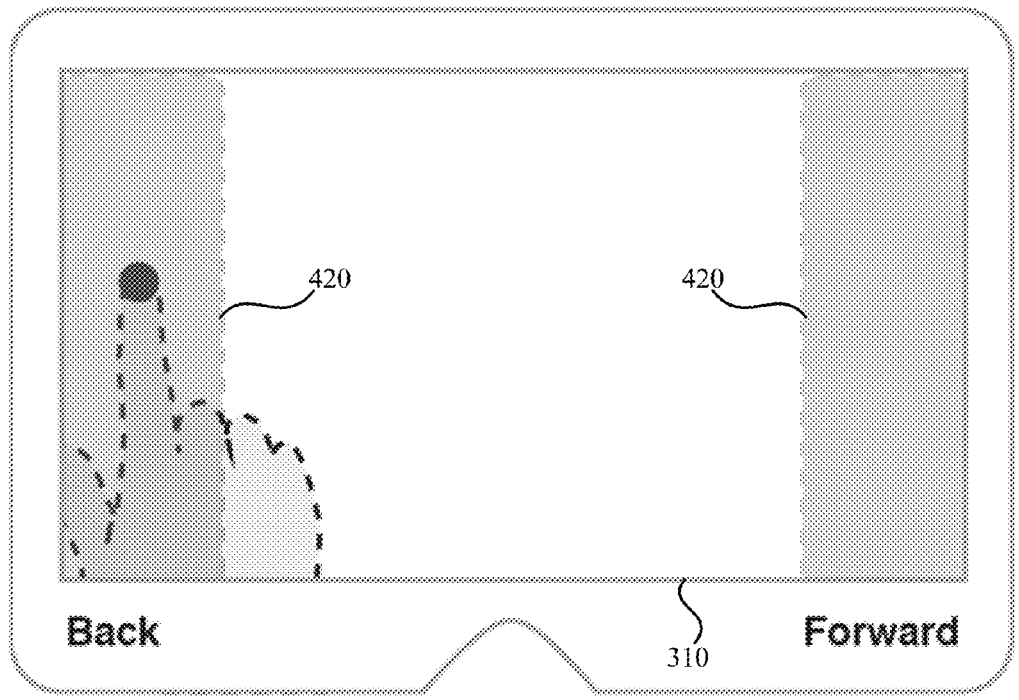
FIGS. 7A-7B are illustrations demonstrating a layout of active regions according to one embodiment.
Figure 7B:
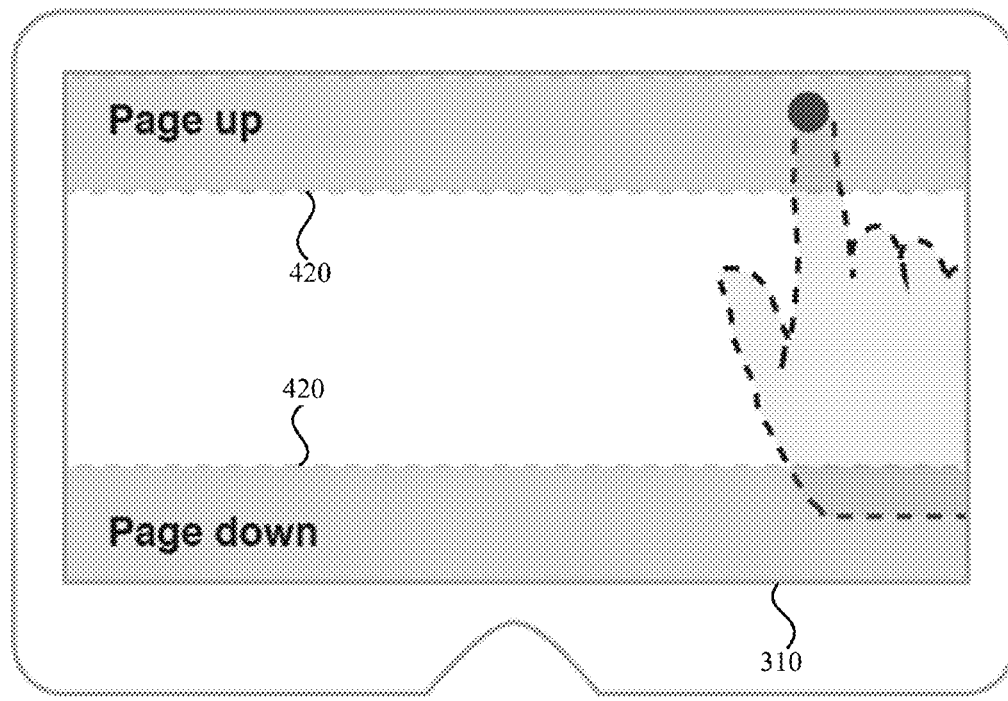

FIGS. 7A and 7B illustrate how active regions 420 at or near the edges of the transparent display area 310 can be associated with certain functions for navigating a user interface, such as "back," "forward," "page up," and/or "page down." Here, the active regions 420 may not correspond to a displayed visual element 410 (not shown). In some embodiments, one or more of the Back, Forward, Page Up, and/or Page Down labels may not be shown in the transparent display area 310. For example, the upper region 420 in FIG. 6B may correspond to a page up command in some embodiments where no writing or label is present. Numerous other configurations can be utilized that associate various active regions 420 to different navigation functions and/or other commands.

Figure 8A:
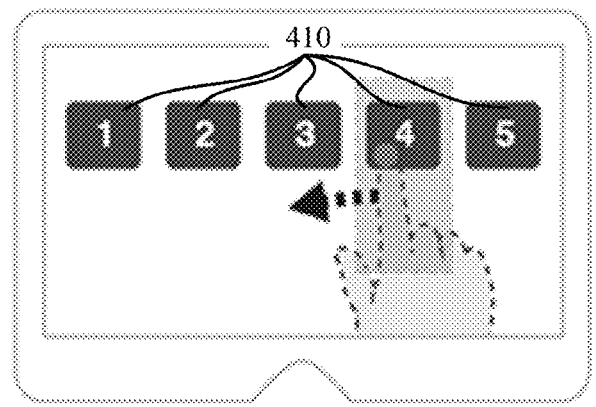
FIGS. 8A-8C are illustrations demonstrating how a GUI may respond to detected movement of an object, according to one embodiment.
Figure 8B:
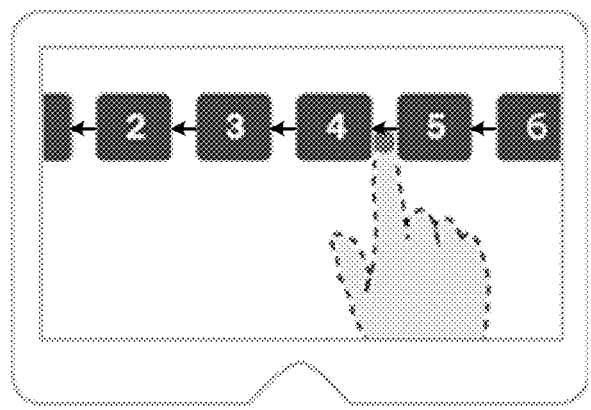
Figure 8C:
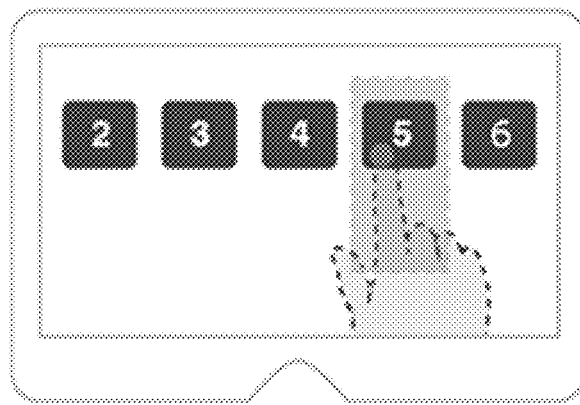

In addition to tracking the location of a tracking point 320, an HMD 120 may further be configured to track the motion of a tracking point 320. Such functionality can enable a user 110 to utilize certain motions, such as "swipes," "flips," and the like. This can enable a user to navigate through menu items and/or other content with even more efficiency than by navigation through position tracking alone. FIGS. 8A-8C illustrate such an embodiment.

In FIG. 8A, a user can move one or more visual elements 410 by selecting a visual element 410 and "swiping" in a certain direction, for example with the entire hand or with just one or more fingers, in which case the HMD 120 causes the visual element 410 to move correspondingly in the swiped direction, as shown in FIG. 8B. Optionally, the user may simply swipe anywhere in the active region 420 corresponding to a visual element 410. As illustrated, the other visual elements 410 may move correspondingly as well, allowing the user to scroll through multiple visual elements 410 easily. Although FIGS. 8A-8C show the user moving all visual elements 410 one position to the left (i.e., moving visual elements "1"-"5" to the left one position to show visual elements "2"-"6"), swiping may result in greater movement of the visual elements 410, depending on the speed, motion, and/or other characteristics of the swipe. Furthermore, swiping may be done in any area of the screen in some embodiments, which may affect functionality. For example, a user may swipe below the displayed visual elements 410 to indicate to the HMD 120 that the user would like to scroll through the visual elements 410 rather than select one of them. In embodiments where the user places a finger on a visual element 410 (or active region 420) and then swipes, the time (for holding a finger still) to activate a swipe/scroll may be less than the time (for holding the finger still) to select the visual element 410.

These GUI-interaction techniques can be extended to augmented reality scenarios, enabling a user to interact with a piece of augmented reality content related to a physical object. Such an augmented reality scenario can occur when an HMD 120 identifies a physical location, object, surface, texture, image, etc., using a camera 210 and/or other sensors. The HMD 120 can then analyze the physical location, object, surface, texture, image, etc. and compare it with a local or online database in an augmented reality and/or visual search application. The analysis can return digital content that the HMD 120 displays such that it appears, from the perspective of the user, in physical proximity to the identified location, object, surface, texture, image, etc. In some embodiments, the digital content appears to be anchored to or displayed on the identified object, surface, etc. The digital content can have interactive elements surrounded by or including active regions of the screen, enabling a user to interact with the displayed digital content. For example, digital content can include a button that says "press me for more information." In some embodiments, an active region may be defined around the button so as to extend the button beyond the button and/or to extend substantially to an edge of the display of the HMD 120 from the button, similar to certain of the embodiments described above. In some embodiments, the button and/or active region appears to be anchored to or displayed on the object, surface, etc. which the active region and/or button is associated with.

The HMD 120 can track the user's hand (or other object), enabling the user to interact with any interactive element(s) of the digital content. For example, the user can select the interactive element in one or more of various ways, such as by moving the user's finger position such that it overlaps with an interactive element (from the perspective of the user), engaging in a "selection" pose, performing a predetermined movement, and/or keeping a finger (or other object) in the element's proximity for a threshold amount of time. The HMD 120, after recognizing selection of the interactive element, can alter the rendering of the digital content and/or launch a second set of digital content. Depending on desired functionality, the second set of digital content also may be anchored to the identified physical location, object, surface, texture, image, etc. (from the perspective of the user).

This augmented reality functionality can be used in countless scenarios to enable the user to learn more about the user's surroundings. For example, if an HMD 120 recognizes a movie poster within the field of view of the user, a virtual "play trailer" button can appear in the HMD's display, which can be activated with a finger press. In another example, a user can spin a virtual 3D model augmented onto a magazine cover with a flick of the hand. In yet another example, a user can look at a billboard and be shown media playback aligned with the physical billboard. Countless other scenarios are contemplated. Thus, in addition to navigating a 2D GUI anchored to the transparent display, techniques provided herein can be expanded to other augmented reality scenarios, enabling interactions with elements of digital content that can be anchored, from the perspective of the user, to the physical world. Because these interactive elements are bound to physical objects in the user's surroundings, corresponding active region regions on the HMD's display may move and scale relative to the physical object's position in relation to the user's point of view.

Figure 9:
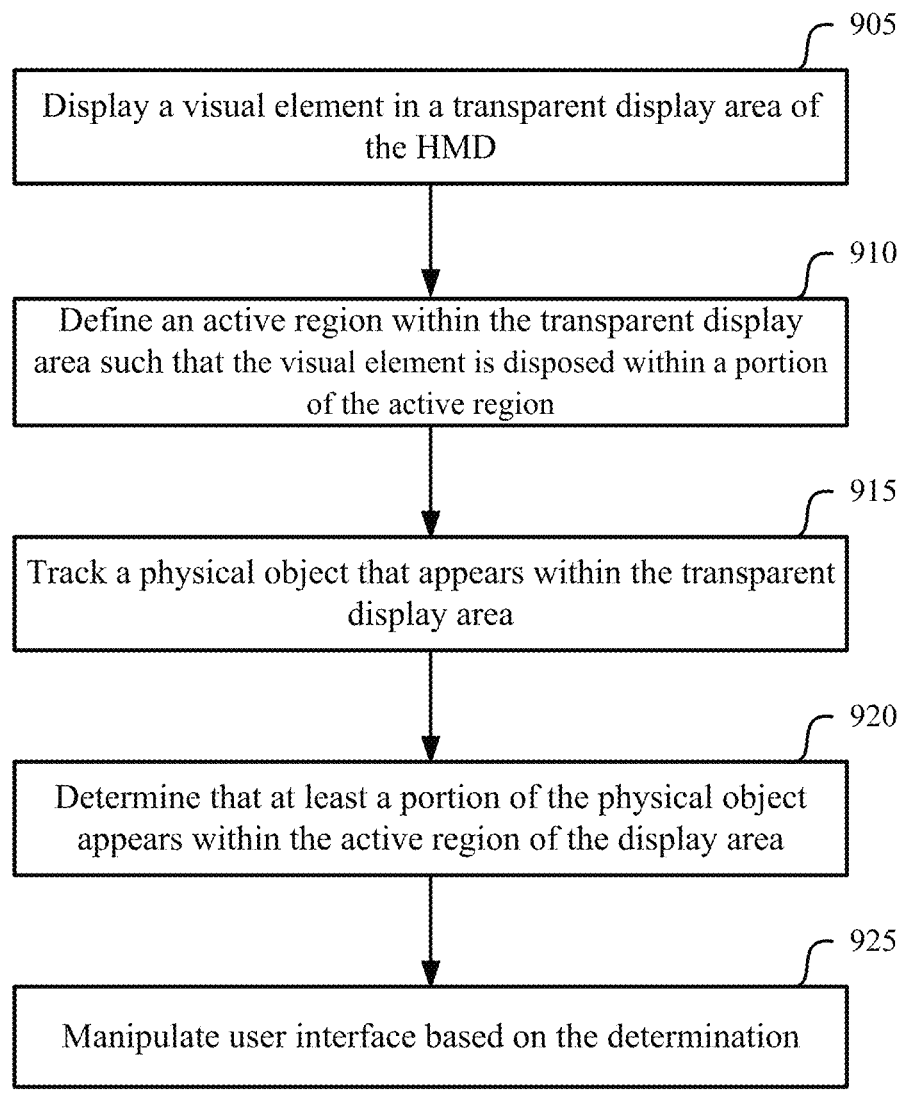
FIG. 9 is a flow diagram illustrating an embodiment of a method of enabling user interaction with an HMD.
Figure 10:
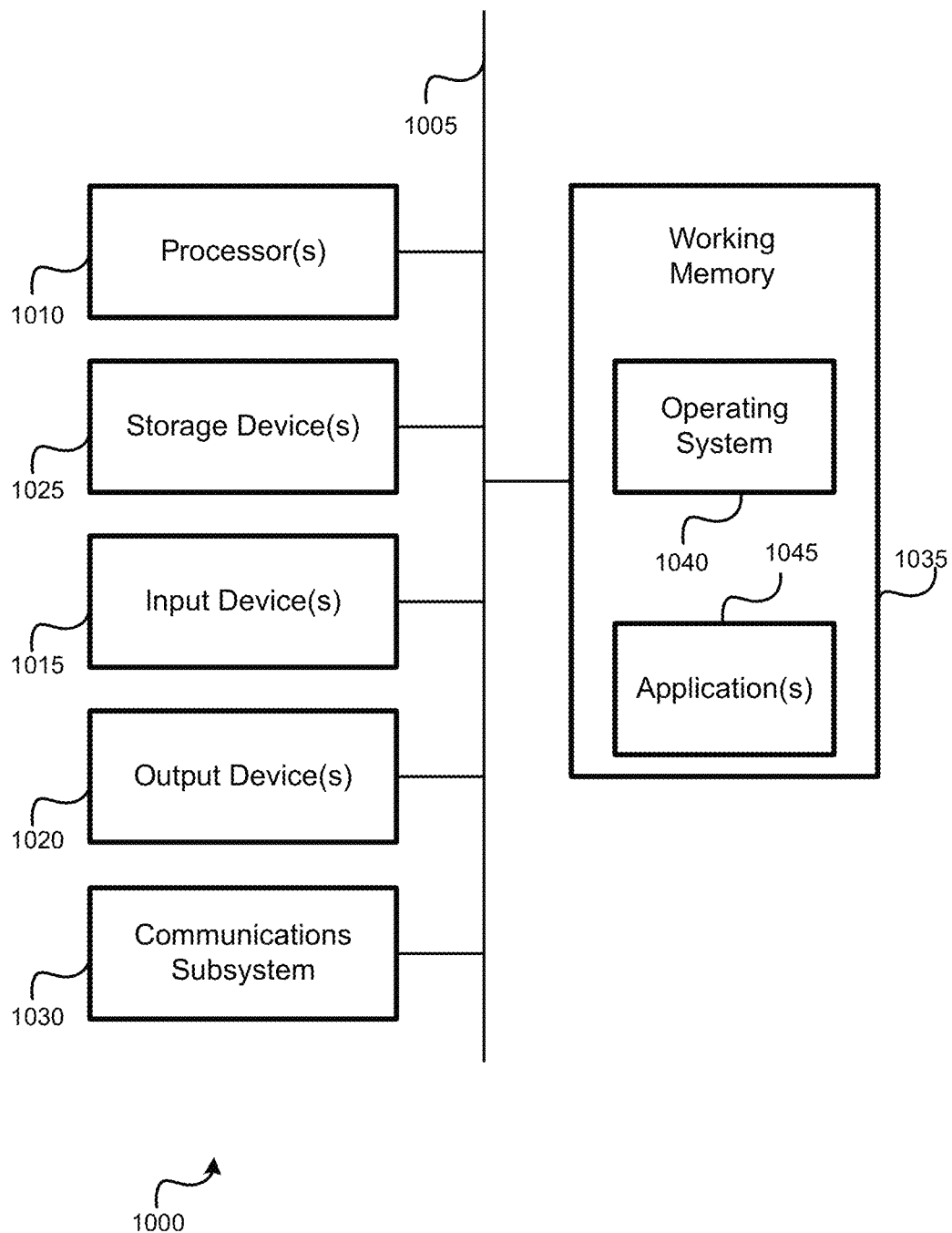
FIG. 10 is a simplified block diagram of an embodiment of a computer system that can be incorporated into and/or communicatively coupled with an HMD.

FIG. 9 is a flow diagram illustrating an embodiment of a method 900 of enabling user interaction with an HMD. Different aspects of the method 900 can be performed by HMDs as described herein and/or by a device controlling an HMD. Accordingly, means for performing each step of method 900 can include hardware and/or software components, such as processing unit, memory, transparent display area, camera, software application, operating system, and/or other components included in and/or communicatively coupled with an HMD. An embodiment of hardware and software aspects of an HMD or of a device configured to control an HMD is illustrated in FIG. 10 and described in more detail below.

At block 905, visual element is displayed in a transparent display area of the HMD. As indicated above, the transparent display area can be at least a portion of a display and/or display means of an HMD configured to allow a user to view visual elements shown on the display as well as physical object in the user's surroundings. In some embodiments, such as those utilizing a retinal projector, the transparent display area can be an area within the field of view of a user that may not necessarily correspond to the area on a physical display or screen. The visual element can be, for example, a visual element displayed as part of a GUI of the HMD. Means for performing the functionality of block 905 can include an operating system, software application, processor, display, and/or other means as described below with respect to FIG. 10.

Here it can be noted that, before the visual element is displayed in the transparent display area of the HMD, the HMD (and/or device communicatively coupled therewith) may determine a set of selectable visual elements to display from, for example, a predefined user menu obtained from an application, database, application programming interface (API), and the like. The HMD may also determine the layout of the visual elements (e.g., utilizing columns, quadrants, etc.), which may be based on any of a variety of factors, such as application type, number of visual elements, user settings, and the like. In some embodiments, a layout may be determined based on one or more user setting (e.g., a preference or setting of the user for columns rather than quadrants), and then the set of visual items arranged on the display such that the determined layout may be utilized. In other embodiments, the layout may be automatically determined based on the type, display properties, or quantity of visual elements in the set. In some embodiments, the layout may be automatically determined based on a field of view of the user, for example to maximize a visibility of the visual elements as displayed to the user.

At block 910, an active region within the transparent display area is defined such that the visual element is disposed within a portion of the active region. The active region can be, for example, a region surrounding a user-selectable visual element shown on a transparent display area. The active region itself may or may not be highlighted and/or otherwise indicated in the transparent display area. Defining the active region may be performed, for example, by a processing unit, memory, and/or other computing means, which can be part of a computing system incorporated into and/or communicatively coupled with the HMD. The active regions may be defined in any of a plurality of configurations. For example, a display may be subdivided (for example, as shown in FIGS. 4-7B) into a plurality of regions that substantially occupy an entire display or field of view in some embodiments. The active regions in these embodiments may be substantially uniform in shape and/or size, or may vary. The active regions may be defined as extending from an icon or other display element, for example substantially to the edge of a screen (for example, as shown in FIGS. 4-7B). Means for performing the functionality of block 910 can include an operating system, software application, processor, display, and/or other means as described below with respect to FIG. 10.

As discussed previously, the active regions may be columns, rows, or other shapes. The active regions may be characterized as regions including an area where an object of interest is not being displayed (for example, the active regions may encompass areas where the visual elements are not being displayed). In such embodiments, the active regions may be defined with respect to an icon or other visual element, or may be separately defined. In embodiments where the active regions are defined with respect to an icon or other visual element, the active regions may be defined to encompass an area which is substantially larger than the icon or visual element. For example, the active region may be defined to be twice as large as the icon or display element (or 3, 5, or 10 times as large, or any other size), or may be displayed so as to be larger than a threshold size when viewed by the user, regardless of how large the icon or visual element is. Moreover, in some embodiments, active regions may be associated with interactive elements, digital content, and/or physical objects in an augmented reality or other software application. Such active regions may change in size, shape, and location within the display area as, for example, a user moves in relation to a physical object. Other configurations of the active regions may also be implemented and/or defined. Further, an area in which to display a visual element within a determined or defined active region may vary. For example, if columnar active regions are being used, the HMD may determine a vertical location within each column to display a respective visual element or may determine to change a size or shape of an visual element within an active region.

At block 915, a physical object that appears within the display area (from the user's perspective) is tracked. Means for tracking can be performed by a camera, sensor, and/or other components configured to capturing image and/or position measurements, communicatively connected with a processing unit, memory, and/or other computing means configured to determine a position based on the image and/or position measurements. Such means are described in additional detail below with respect to FIG. 10.

As indicated above, components for tracking the physical object can be calibrated with components for displaying visual elements in the transparent display area, enabling the HMD to determine what the user sees. Correspondingly, at block 920, the method 900 includes determining that at least a portion of the physical object appears within the active region of the display area, from the user's perspective. Here again, means for making the determination can include a processing unit, memory, and/or other computing means as described in regard to FIG. 10, and may employ tracking means described below. In one embodiment, an extremum or other end of a range may be detected as the tracking point 320. In one embodiment, an active region is selected if a tracked object occupies a majority or large portion of the region. (In FIG. 4D, for example, the user's finger and/or hand occupies a substantial portion of the active region 420-1, such as at least the bottom half of the active region 420-1. In some embodiments, the active regions may be configured to substantially mirror a shape of an object used to select items or otherwise control the GUI; for example, the active regions may comprise columns when an elongated control object or selection object such as a finger is used).

Tracking means may engage any of a variety of tracking algorithms. Certain tracking algorithms may simply track a single point (e.g., a coordinate on the transparent display area) and/or region associated with the object and/or a location on the object (e.g., a fingertip). More sophisticated tracking algorithms may track other features, such as the object's shape (e.g., to recognize an engagement pose), distance (e.g., to determine whether a user "presses" a button), and more. Embodiments may be able to track multiple and/or different physical objects for GUI interaction. Furthermore, embodiments are not limited to any one method. In some embodiments, the HMD may be configured to accept inputs from only certain objects. For example, the HMD may be configured to detect whether an object is a finger or a hand, subsequently accept inputs from the finger or hand, and reject inputs from other objects. Additionally or alternatively, an HMD may include eye tracking (or "gaze" tracking) that can be used in combination with finger and/or hand tracking. This can increase confidence that the user is trying to select an object or region because the user's gaze will probably be looking at that region, confirming the selection. Optionally, in scenarios where it is likely the user is looking at his or her finger, the user's gaze may also be tracked to increase confidence of the tracked position of the finger.

At block 925, a user interface is manipulated based on the determination made at block 920. Here again, means for manipulating the user interface can include a processing unit, memory, and/or other computing means coupled to a display showing the user interface (e.g., a GUI).

It should be appreciated that the specific steps illustrated in FIG. 9 provide an example of a method 900 of enabling user interaction with an HMD. Alternative embodiments may include alterations to the embodiments shown. For example, alternative embodiments may include defining the active region within the transparent display area at a different point during the method 900. Yet other embodiments may include performing actions to calibrate the physical object tracking components with the display components of the HMD. Furthermore, additional features may be added, removed, or combined depending on the particular applications. One of ordinary skill in the art would recognize many variations, modifications, and alternatives.

FIG. 10 illustrates an embodiment of a computer system 1000, which may be incorporated into and/or communicatively coupled with an HMD. One or more components of the computing system 1000 could be shared between different devices, such as an HMD, smart phone, tablet, personal computer, or other computing device. In some embodiments, software and other applications could be run on a separate device communicatively linked to the display. In other embodiments, an HMD may have some or all of the computer system 1000 integrated therewith.

FIG. 10 provides a schematic illustration of one embodiment of a computer system 1000 that can perform the methods provided by various other embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include a processing unit, such as processor(s) 1010, which can include without limitation one or more general-purpose processors, one or more special-purpose processors (such as digital signal processors, graphics acceleration processors, and/or the like), and/or other processing means, which, as stated above, can be utilized to perform various steps, such as those described in relation to FIG. 9. Hardware elements may also include one or more input devices 1015, which can include without limitation one or more camera, sensors (e.g., light, heat, ultrasound, RF, and/or other sensors capable of providing data for tracking an object), and/or other tracking devices, which can be included and/or otherwise utilized, together with the processor(s) 1010 as tracking means to track a physical object as described herein. Other devices such as a touch pad, keyboard, microphone, and/or the like may also be included. One or more output devices 1020 are also included. These output devices can include one or more transparent display devices and/or other display means, as well as speakers and/or other devices, with may be utilized to perform one or more steps as described in relation to FIG. 9. For example, when the system 1000 is implemented in an HMD, the output device 1020 may include a transparent or semi-transparent display. In embodiments where the device 1000 is implemented in a phone or other device controlling the HMD, the output device 1020 may comprise a touchscreen or may be omitted.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 1002.11 device, a WiFi device, a WiMax device, cellular communication facilities, etc.), and/or the like. The communications subsystem 1030 may include one or more input and/or output communication interfaces to permit data to be exchanged with a network, other computer systems, and/or any other electrical devices/peripherals. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application(s) 1045, which may comprise computer programs provided by various embodiments, and/or may be designed to implement methods, and/or configure systems, provided by other embodiments, as described herein. Merely by way of example, a portion of one or more procedures described with respect to the method(s) discussed above, such as the method 900 described in relation to FIG. 9, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of providing a user interface in a head-mounted display (HMD), the method comprising:
    determining a triggering event has occurred, based on a determination that a physical object has appeared, from the user's perspective, within a transparent display area of the HMD;
    in response to determining that the triggering event has occurred, causing a plurality of visual elements including a first visual element to be displayed in the transparent display area, each visual element of the plurality of visual elements being selectable by a user of the HMD;
    defining a plurality of active regions wherein, for each visual element of the plurality of visual elements, a corresponding active region of the transparent display area, larger than the visual element, is defined such that the visual element is disposed within a portion of the active region, the active region of the first visual element comprising a first active region;

tracking the physical object that appears, from a perspective of the user, within the transparent display area;

determining at least a portion of the physical object appears, from the user's perspective, within the first active region, indicating a selection of the first visual element; and manipulating, with a processing unit, the user interface, based on the selection.

2. The method of providing the user interface in the HMD as recited in claim 1, wherein the triggering event comprises at least one of:

the physical object appearing, from the user's perspective, within the transparent display area of the HMD for a threshold period of time, the physical object engaging in a certain pose, the physical object appearing, from the user's perspective, at a certain portion of the transparent display area of the HMD, or any combination thereof.

3. The method of providing the user interface in the HMD as recited in claim 1, wherein a border of the first active region extends to an edge of the transparent display area.

4. The method of providing the user interface in the HMD as recited in claim 1, further comprising causing the first active region to be displayed in the transparent display area based on the tracking.

5. The method of providing the user interface in the HMD as recited in claim 1, further comprising causing each active region of the plurality of active regions to be displayed in the transparent display area.

6. The method of providing the user interface in the HMD as recited in claim 1, wherein the plurality of active regions comprises a series of columns disposed, from the user's perspective, within the transparent display area.

7. The method of providing the user interface in the HMD as recited in claim 1, wherein the physical object comprises a hand of the user.

8. The method of providing the user interface in the HMD as recited in claim 1, further comprising determining the physical object is within a threshold distance from the HMD.

9. A head-mounted display (HMD) comprising:

a display having a transparent display area;

a sensor configured to provide data regarding objects viewable through the transparent display area by a user of the HMD; and a processing unit communicatively coupled with the display and the sensor, the processing unit configured to perform functions including:

determining a triggering event has occurred, based on a determination that a physical object has appeared, from the user's perspective, within a transparent display area of the HMD;

in response to determining that the triggering event has occurred, causing the display to show a plurality of visual elements including a first visual element in the transparent display area, each visual element of the plurality of visual elements being selectable by the user of the HMD;

defining a plurality of active regions wherein, for each visual element of the plurality of visual elements, a corresponding active region of the transparent display area such that the visual element is disposed within a portion of the active region, the active region of the first visual element comprising a first active region;

using the data from the sensor to track the physical object that appears, from a user's perspective, within the transparent display area;

determining at least a portion of the physical object appears, from the user's perspective, within the first active region, indicating a selection of the first visual element; and manipulating one or more elements displayed on the display based on the selection.

10. The HMD as recited in claim 9, wherein the processing unit is configured to identify a triggering event comprising:

the physical object appearing, from the user's perspective, within the transparent display area of the HMD for a threshold period of time, the physical object engaging in a certain pose, the physical object appearing, from the user's perspective, at a certain portion of the transparent display area of the HMD, or any combination thereof.

11. The HMD as recited in claim 9, wherein the processing unit is configured to define a border of the first active region such that the border of the first active region extends to an edge of the transparent display area.

12. The HMD as recited in claim 9, wherein the processing unit is configured to cause the display to show the first active region based on the tracked physical object.

13. The HMD as recited in claim 9, wherein the processing unit is configured to cause the display to show each active region of the plurality of active regions.

14. The HMD as recited in claim 9, wherein the processing unit is configured to cause the display to show the plurality of active regions such that the plurality of active regions comprise a series of columns disposed, from the user's perspective, within the transparent display area.

15. The HMD as recited in claim 9, wherein the processing unit is further configured to determine the physical object is within a threshold distance from the HMD.

16. A non-transitory computer-readable storage medium encoded with instructions for causing a head-mounted display (HMD) to perform functions including:

determining a triggering event has occurred, based on a determination that a physical object has appeared, from the user's perspective, within a transparent display area of the HMD;

in response to determining that the triggering event has occurred, causing a plurality of visual elements including a first visual element to be displayed in the transparent display area, each visual element of the plurality of visual elements being selectable by a user of the HMD;

defining a plurality of active regions wherein, for each visual element of the plurality of visual elements, a corresponding active region of the transparent display area, larger than the visual element, is defined such that the visual element is disposed within a portion of the active region, the active region of the first visual element comprising a first active region;

tracking the physical object that appears, from a user's perspective, within the transparent display area;

determining at least a portion of the physical object appears, from the user's perspective, within the first active region, indicating a selection of the first visual element; and manipulating one or more elements displayed in the transparent display area based on the selection.

17. An apparatus comprising:
means for determining a triggering event has occurred, based on a determination that a physical object has appeared, from the user's perspective, within a transparent display area of the HMD;
means for, in response to determining that the triggering event has occurred, causing a plurality of visual elements including a first visual element to be displayed in the transparent display area each visual element of the plurality of visual elements being selectable by a user of the HMD;
means for defining a plurality of active regions wherein, for each visual element of the plurality of visual elements, a corresponding active region of the transparent display area, larger than the visual element, is defined such that the visual element is disposed within a portion of the active region, the active region of the first visual element comprising a first active region;
means for tracking the physical object that appears, from a user's perspective, within the transparent display area;
means for determining at least a portion of the physical object appears, from the user's perspective, within the first active region, indicating a selection of the first visual element; and
means for manipulating, with a processing unit, one or more elements based on the selection.

18. The apparatus as recited in claim 17, wherein the for determining the triggering event has occurred include means for determining at least one of:
the physical object has appeared, from the user's perspective, within the transparent display area of the HMD for a threshold period of time,
the physical object has engaged in a certain pose,
the physical object has appeared, from the user's perspective, at a certain portion of the transparent display area of the HMD, or
any combination thereof.

19. The apparatus as recited in claim 17, further including means for causing each active region of the plurality of active regions to be displayed in the transparent display area.

20. The apparatus as recited in claim 17, further comprising means for determining the physical object is within a threshold distance from the HMD.

* * * * *